United States Patent
Starr et al.

(10) Patent No.: US 10,350,610 B2
(45) Date of Patent: Jul. 16, 2019

(54) CLASSIFIER CLEANING DEVICE

(71) Applicant: FLSmidth A/S, Valby (DK)

(72) Inventors: David Starr, Forest Lake (AU); Taavi Orupold, Woolloongabba (AU)

(73) Assignee: FLSMIDTH A/S, Valby (DK)

(*) Notice: Subject to any disclaimer, the term of this patent is extended or adjusted under 35 U.S.C. 154(b) by 48 days.

(21) Appl. No.: 15/501,224

(22) PCT Filed: Sep. 17, 2015

(86) PCT No.: PCT/IB2015/057164
§ 371 (c)(1),
(2) Date: Feb. 2, 2017

(87) PCT Pub. No.: WO2016/046705
PCT Pub. Date: Mar. 31, 2016

(65) Prior Publication Data
US 2017/0232448 A1 Aug. 17, 2017

Related U.S. Application Data

(60) Provisional application No. 62/055,748, filed on Sep. 26, 2014.

(51) Int. Cl.
*B03B 5/62* (2006.01)
*B01J 8/22* (2006.01)
(Continued)

(52) U.S. Cl.
CPC ............... *B03B 5/623* (2013.01); *B01J 8/22* (2013.01); *B01J 8/44* (2013.01); *B08B 5/00* (2013.01);
(Continued)

(58) Field of Classification Search
CPC .... B03B 5/20; B03B 5/22; B03B 5/62; B03B 5/623; B03B 5/66; B01J 8/20; B01J 8/22;
(Continued)

(56) References Cited

U.S. PATENT DOCUMENTS 640,117 A * 12/1899 Earle ...................... B03B 5/623
209/159
3,333,692 A 8/1967 Eveson et al.
(Continued)

FOREIGN PATENT DOCUMENTS

AU 2013388348 A1 11/2015
AU 2013388349 A1 11/2015
(Continued)

OTHER PUBLICATIONS

International Search Report and Written Opinion dated Dec. 21, 2015, 12 pages, PCT/IB2015/057164.

*Primary Examiner* — Joseph C Rodriguez
(74) *Attorney, Agent, or Firm* — Jeffrey A. Sharp

(57) ABSTRACT

A classifier cleaning and optimization device is provided. The device includes a chamber that is adapted to contain a fluidized bed, an array of two or more adjacently arranged inclined plates positioned above the fluidized bed wherein an inclined channel is formed between each pair of adjacent inclined plates, and a means for introducing a process liquid into the chamber between the fluidized bed and the array of inclined plates such that in use, the process fluid travels through at least one of the inclined channels. A method of cleaning the separation section of a classifier is also disclosed herein.

8 Claims, 3 Drawing Sheets

(51) Int. Cl.
  *B01J 8/44* (2006.01)
  *B08B 5/00* (2006.01)
  *B08B 9/08* (2006.01)
  *B08B 3/02* (2006.01)
  *B08B 5/02* (2006.01)
(52) U.S. Cl.
  CPC .................. *B08B 9/08* (2013.01); *B08B 3/02* (2013.01); *B08B 5/02* (2013.01)
(58) Field of Classification Search
  CPC ........ B01J 8/24; B01J 8/36; B01J 8/44; B07B 1/55; B07B 4/08
  See application file for complete search history.

(56) References Cited

U.S. PATENT DOCUMENTS

| | | | | |
|---|---|---|---|---|
| 4,089,782 A | * | 5/1978 | Huebner | B01D 21/10 210/206 |
| 4,151,084 A | * | 4/1979 | Probstein | B01D 21/0051 210/322 |
| 4,202,778 A | * | 5/1980 | Middelbeek | B01D 17/0211 210/522 |
| 4,466,542 A | * | 8/1984 | Oetiker | B02B 1/02 209/2 |
| 4,589,981 A | | 5/1986 | Barari et al. | |
| 4,681,683 A | * | 7/1987 | Lindstol | B01D 21/0045 210/521 |
| 4,957,628 A | * | 9/1990 | Schulz | B01D 21/0006 210/519 |
| 6,425,485 B1 | * | 7/2002 | Mankosa | B03B 5/623 209/158 |
| 6,814,241 B1 | * | 11/2004 | Galvin | B01J 8/22 209/158 |
| 7,147,111 B2 | * | 12/2006 | Fendley | B01D 21/0039 210/522 |
| 7,964,101 B2 | * | 6/2011 | Slough | B01D 21/0045 175/66 |
| 8,377,291 B2 | * | 2/2013 | Eckman | B01D 29/035 210/86 |
| 9,415,397 B1 | * | 8/2016 | Christodoulou | B03B 5/623 |
| 9,579,659 B2 | * | 2/2017 | Starr | B03B 5/623 |
| 9,839,891 B2 | * | 12/2017 | Ingels | B01J 8/24 |
| 2010/0133156 A1 | * | 6/2010 | Han | C02F 3/06 210/109 |

FOREIGN PATENT DOCUMENTS

| | | |
|---|---|---|
| CA | 2793867 A1 | 10/2011 |
| WO | 2000045959 A1 | 8/2000 |
| WO | 2015071860 A1 | 5/2015 |

\* cited by examiner

CLASSIFIER CLEANING DEVICE

FIELD OF THE INVENTION

The present invention relates generally to a method or an apparatus for cleaning and optimizing the separation section of a classifier. The invention relates particularly, though not exclusively, to the cleaning of the inclined plate section of a fluidized lamellae classifier, particle fractionator or Reflux™ classifier and for optimizing fluid flow through such a classifier.

BACKGROUND OF THE INVENTION

Any discussion of the prior art throughout the specification should in no way be considered as an admission that such prior art s widely known or forms part of the common general knowledge in the field.

In many industrial processes it is necessary to classify particles according to their size, and sometimes according to their density. For example, in mineral processing, screens, cyclones, and elutriators are often used to sort particles prior to downstream beneficiation. Classification may proceed either in a wet or a dry state. Although the aim may be to separate the particles at two specific sizes, there is usually a high degree of so-called misplaced material, with a portion of coarse particles reporting with the fine particle stream.

U.S. Pat. Nos. 6,814,241, 7,334,689, WO 2008/064406, and US 2014/0216986 disclose a device for separating particles by size or density using a fluidized bed in a chamber. In a preferred embodiment, the device separates low density particles from a feed slurry. The slurry is introduced below a set of substantially parallel inclined channels where the slurry is then fluidized by a fluidization fluid. The densest and largest particles located in the slurry settle to the bottom of the chamber and are removed through an underflow outlet. The remaining particles in the slurry are carried by a flow of fluidization fluid upward and into the inclined channels. Within the inclined channels, the flow carries the remaining particles upwards towards an overflow launder while simultaneously the particles settle towards a lower inclined surface of the inclined channels. The less dense and smaller particles then escape the device by passing out of the inclined channels and into the overflow launder before they are able to settle onto the lower surfaces of the inclined channels. The denser and larger particles return to the chamber, settling onto the lower surfaces of the inclined channels and then sliding down the lower surfaces and into the chamber. By this means, the low density particles report to the overflow and the high density particles are returned to the chamber and in turn report to the underflow. An example of a classifier with an array of parallel plates forming inclined channels is a Reflux™ classifier.

It has been found that in continuous operation material tends to build up within the inclined channels, which requires the device to be shut down for a period of time and cleaned by hand. These periods of shut down are costly, not only from the standpoint of labor to clean the device, but also from lost production due to machine being out of operation. In addition, it has been discovered that additional cleaning benefits can be realized and the performance of the classifier can be optimized by periodically injecting additional fluid, preferably water, into an area of the classifier located below an array of plates. In one embodiment, the thus injected water combines with the fluidization fluid and the liquid portion of the feed slurry while the device is in operation to thereby affect the movement of the particles through the inclined channels.

The present invention aims to provide a method or apparatus that can achieve the dual function of both cleaning the classifier device while optimizing its performance. The method and apparatus of the invention is utilized to prevent the buildup within the inclined channels and/or clean the inclined channels while the device is in operation eliminating the need for frequent shutdowns to clean the device. In addition, the apparatus is utilized to optimize the fluid flow through each array of inclined plates thereby improving the material separation. The apparatus of the invention is adapted to adjust the fluid flow through such array of inclined plates while the device is in operation depending on where a particular array of plates is located in the device and the distance of such array from the fluidized bed.

SUMMARY OF THE INVENTION

A classifier is provided that includes a chamber that is adapted to contain a fluidized bed, an array of two or more adjacently arranged inclined plates positioned above the fluidized bed wherein an inclined channel is formed between each pair of adjacent inclined plates, and a means for introducing a process liquid into the chamber below the array of inclined plates such that in use, the process fluid travels through at least one inclined channel. In an alternative embodiment, the introduction means introduces the process liquid into the chamber between the fluidized bed and the array of inclined plates such that in use, the process fluid travels through at least one of the inclined channels.

Preferably, the classifier has at least one de-aeration chamber for feeding slurry into the chamber and at least one overflow launder positioned adjacent the upper edges of the inclined plates for removal of overflow particles.

The arrays of inclined plates may be mounted in the chamber; preferably, the arrays of inclined plates are arranged in a separate housing where the chamber is in fluid communication with the housing.

Preferably, said array of inclined plates comprises an array of parallel, equally spaced inclined plates. An inclined channel is formed between each pair of equally spaced inclined plates. The inclined channels are in fluid communication with the chamber and adjacent overflow launders. In one embodiment, one array of inclined plates is diametrically opposed to another array of inclined plates. Preferably, a collection channel separates the opposed arrays where the overflow launders adjacent to each of the arrays are in fluid communication with the collection channel. The collection channel is in fluid communication with an overflow outlet.

Preferably, said array of plates extends substantially horizontally across said chamber.

Preferably, two or more arrays of inclined plates are provided, each array being horizontally spaced from the other arrays. Preferably, each de-aeration chamber is positioned substantially below a corresponding overflow launder; both of which are positioned in a space between adjacent arrays of inclined plates.

The apparatus of the present invention comprises an introduction means which introduces the process liquid into the chamber at a location below the arrays of inclined plates to combine with the fluidized bed's slurry as it travels through the inclined channels causing obstinate particles to report to the overflow. In a preferred embodiment, the introduction means is in fluid communication with a distributor means for alternatingly introducing the process liquid and a cleaning gas into the chamber such that in use, the process liquid and the cleaning gas alternatingly travel into the inclined channels. In a more preferred embodiment, the distributor means is regulated by a controller which has the capability of adjusting both the intervals of liquid and gas injection but also the rate of injection of both fluids, either according to a predetermined sequence or in direct response to an operator's input or operational requirements. As is appreciated by someone skilled in the art, the means for distribution of the process fluid and cleaning gas includes, but aren't limited to valves, nozzles, and manifolds. The process liquid serves to both clean the inclined channels and to optimize the flow through the inclined channels. During the introduction of the cleaning gas, a burst of bubbles is created in the chamber that travels through the inclined channels causing substantially all material in the inclined channels to report to the overflow launders.

The introduction means may comprise at least one fluid introduction tube that extends into the chamber. As is appreciated by someone skilled in the art, other means for introducing the process fluid includes, but aren't limited to, nozzles, spargers, hoses, pipes, and tubes. Preferably, the introduction means comprises a plurality of fluid introduction tubes that extend into the chamber. Preferably, one fluid introduction tube is positioned directly below each array of inclined plates. Preferably the fluid introduction tubes are each positioned between a wall of the housing and/or a de-aeration chamber. As is appreciated by someone skilled in the art, the position and type of introduction means may be altered in accordance with specific design criteria.

The fluid introduction tubes may be provided with holes along at least a part of the length of the tube. Preferably, the holes are positioned along the entire length of and on an underside 402 of each tube, the underside being nearest the fluidized bed. The holes may be positioned in one or more rows along the length of each tube. Preferably, the tubes are conical in shape, with two rows of holes located along the length of each tube, with a first row being located substantially 135° from the highest point of the tube and a second row, when measured in the same direction from such highest point, being located substantially 225° therefrom. As is appreciated by someone skilled in the art, the flow rate of the process liquid through the fluid introduction tubes may vary from one tube to another in accordance with specific design criteria.

In a preferred embodiment, each of the fluid introduction tubes is in fluid communication with the chamber and a dedicated distributor for alternatingly introducing the process liquid and the cleaning gas into the chamber such that in use, the process liquid and the cleaning gas alternatingly travel through the inclined channels. The cleaning gas may be introduced alternatingly among each of the fluid introduction tubes according to a predetermined sequence. Preferably, each distributor is regulated by a controller. Preferably, the duration of the introduction of the cleaning gas is shorter than the duration of the introduction of the process liquid. Preferably, the predetermined sequence cycles the cleaning gas through each of the introduction tubes for a time period depending upon the degree of blockage in the respective inclined channels. In a preferred embodiment, the sequence is automated by monitoring flow through certain inclined channel whereby when the flow in an inclined channel reaches a predetermined level the respective distributor automatically cycles the cleaning gas into the respective fluid introduction tube. In an alternative embodiment, the sequence includes the cleaning gas being introduced through each introduction tube for less than one minute each hour. As is appreciated by someone skilled in the art, the sequence may also vary based upon historic problem areas within the arrays, the percentage of solids in the slurry, the type of material in the slurry, the inclined channel's position within the array, or other design criteria. Depending upon the process needs, there may be times during the operation of the classifier device when a choice is made to have nothing flowing through the fluid introduction tubes.

In one embodiment, an accumulator is provided wherein the cleaning gas accumulates under pressure in a plenum and then is released in a burst from the plenum to the distributor means. In a preferred embodiment, compressed air supplied directly to each of the distributor means.

Preferably, the process liquid is water but may include, but is not limited to, detergents, diesel fuel, surface active agents, or any other type of liquid as can be appreciated by someone skilled in the art.

Preferably, the cleaning gas is compressed air but may include, but is not limited to, nitrogen, helium, or any other type of gas as can be appreciated by someone skilled in the art.

According to another aspect of the present invention there is provided a method of cleaning and optimizing the flow of classifiable particles through inclined plates in a classifier, said method comprising the steps of:

providing a fluidized bed within a chamber;

positioning an array of two or more adjacently arranged inclined plates above the fluidized bed wherein an inclined channel is formed between each pair of adjacent inclined plates; and introducing a process liquid into the chamber below the array of inclined plates such that in use, the process liquid travels through at least one inclined channel.

In an alternative form of the invention, the introduction step provides for introducing the process liquid into the chamber between the fluidized bed and the array of inclined plates such that in use, the process liquid travels through at least one inclined channel.

Preferably, the fluidized bed is provided with a fluidization fluid at a predetermined rate, in combination with selected sizes, inclination and spacings of said inclined plates, so as to achieve desired separation of sizes or densities with the lower density particles reporting an overflow and the higher density particles reporting an underflow.

Generally the particles and the vast majority of the fluidization fluid are introduced to the chamber as separate streams. Alternatively the particles are incorporated in the fluidization fluid which may, for example, be in the form of a slurry.

Typically there is provided a plurality of arrays within a separate housing or within the chamber. A series of overflow launders and a series of de-aeration chambers are positioned between adjacent arrays of inclined plates.

In one form of the invention, the method includes the step of feeding a feed material containing mixed particles of higher and lower densities into the chamber. Preferably, the feed material is fed into the chamber through the de-aeration chambers.

Each array of parallel, equally spaced inclined plates act as an inclined hydraulic screen causing the particles of different size or density ranges to locate into different zones within the classifier. Preferably, overflow material containing smaller or less dense particles is removed from the classifier by the overflow launders whereas the underflow material containing larger or denser particles is removed from the underflow outlet positioned near a bottom of the chamber.

In operation, it has been observed that material builds up in the inclined channels. Process liquid is introduced into the chamber below the array of inclined plates such that, in use the process fluid travels through the inclined channels causing obstinate particles to report to the overflow launders.

In one embodiment, the introduction step further comprises alternating the introduction of the process liquid and the cleaning gas into the chamber. Preferably, the introduction step further comprises introducing the cleaning gas such that in use, a burst of bubbles travel through the inclined channels causing substantially all of the material within the inclined channels to report to the overflow launders.

In one embodiment, the introduction step further comprises introducing the process liquid and the cleaning gas through a plurality of fluid introduction tubes. Preferably, the introduction step further comprises introducing the cleaning gas alternatingly between each of the fluid introduction tubes in a desired sequence. The fluid introduction tubes are provided with a plurality of holes. In a preferred embodiment, the flow rate of the cleaning gas is less than 0.06 m3/min per hole.

The device used to perform the invention may be a Reflux™ classifier of the type described in our earlier application US2014/0216986, or some other variation of a Reflux classifier, in which a single or plurality of inclined channels is used to separate material. Feed slurry is introduced into the chamber through the de-aeration chambers. The slurry combined with the fluidization liquid, which is introduced through fluidization nozzles, form a fluidized bed within the chamber. The fluidized bed facilitates certain less dense particles to travel to the inclined channels while other, more dense particles, are removed from the bottom of the chamber.

Once the particles enter the inclined channels, less dense particles report to the overflow launders while the denser particles travel downwards and return to the chamber. Some particles may prove to be difficult to convey either upward towards the overflow or downwards and out of the inclined channel. Thus, this material begins to build up within the inclined channels creating inefficiency in the operation of the classifier and eventually leading to the classifier being taken offline for maintenance. It is desirable to use this invention to introduce process liquid into the chamber between the arrays of inclined plates and the fluidized bed such that in use, the process liquid travels though the inclined channels thereby facilitating the appropriate reporting of this obstinate material. Periodically, alternating the introduction of a cleaning gas into the chamber further facilitates the removal of this material.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of classifiers are shown in the accompanying drawings.

DETAILED DESCRIPTION OF PRESENT PREFERRED EMBODIMENTS

Figure 1:
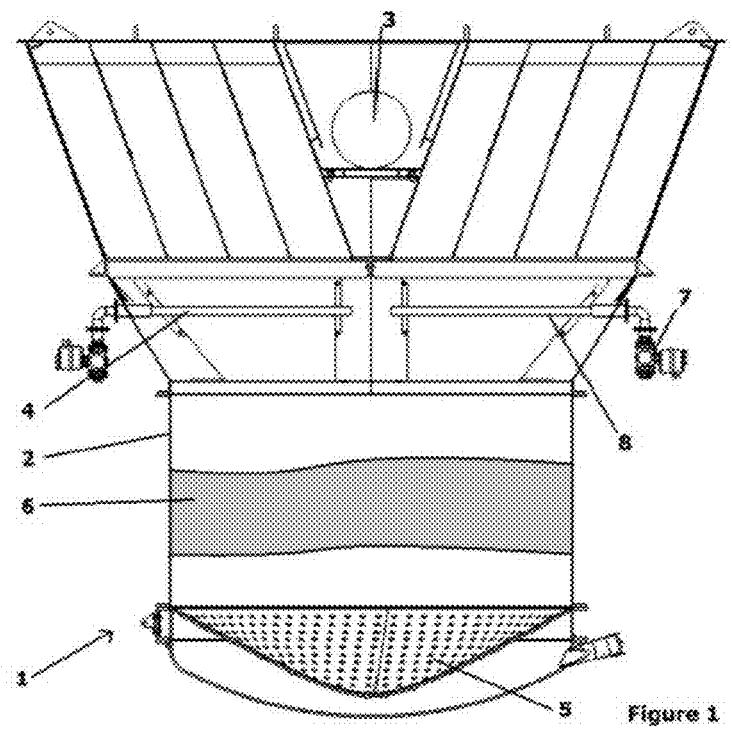
FIG. 1 is a side view of a first present preferred embodiment of a classifier.
Figure 2:
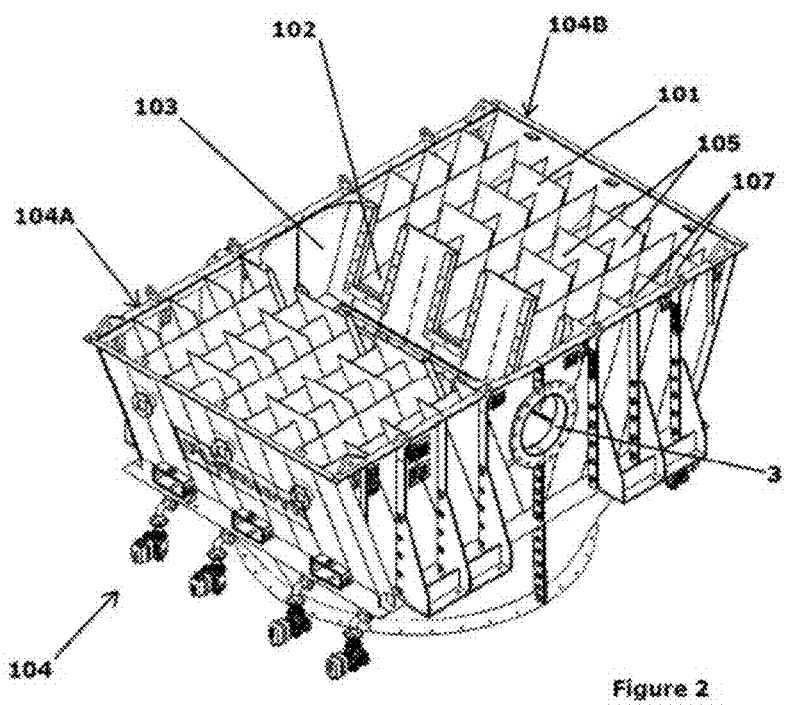
FIG. 2 is a top view of the first present preferred embodiment of a classifier.
Figure 3:
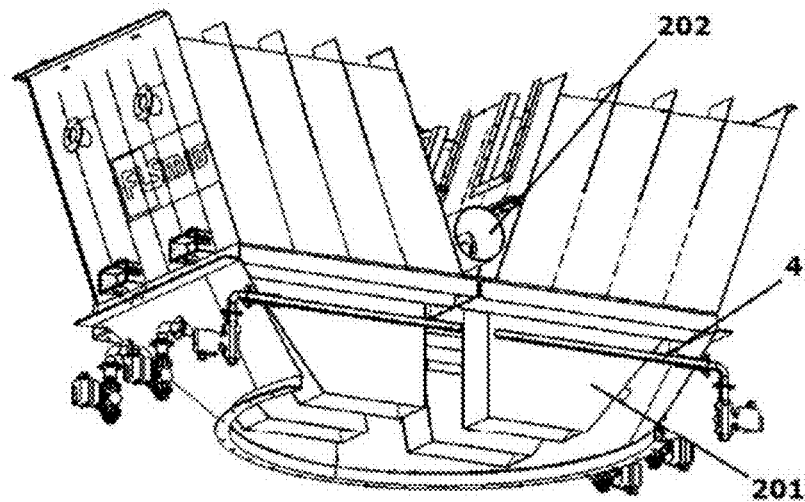
FIG. 3 is a bottom view of the first present preferred embodiment of a classifier.
Figure 4:
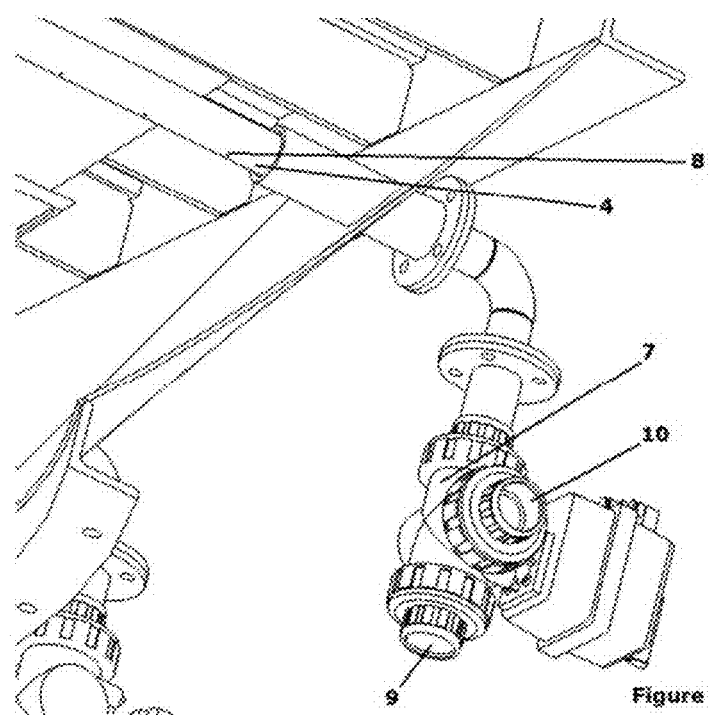
FIG. 4 is a close up view of the first present preferred embodiment of an introduction tube within a classifier.

Referring to FIGS. 1-4, a classifier 1 is shown used to separate particles, which are located in a slurry, on the basis of both size and density. The classifier includes a chamber 2, a separation housing 104, an overflow outlet 3, a series of inclined plate arrays 101, a series of overflow launders 102, and a series of de-aeration chambers 201. The housing 104 is used to house the plate arrays 101, the launders 102, and the de-aeration chambers 201. The housing 104 is in fluid communication with the chamber 2. It should be appreciated that the housing 104 and the chamber 2 may be shaped and sized differently according to design requirement. It should also be appreciated that a top of the housing 104 is not shown in the FIGS in order to more clearly show the plate arrays 101 and launders 102.

In the depicted embodiment, there are eight sets of plate arrays 101. However, it should be appreciated that the number of plate arrays 101 may be varied depending on design criteria. Each plate array 101 is made up of spaced apart inclined plates 105 that preferably are substantially parallel. A series of inclined channels 107 are formed between each pair of inclined plates 105. A portion of the plate arrays 101 that is positioned in a portion of the housing 104A are arranged at an angle of inclination that is diametrically opposed to another portion of the plate arrays 101 that is positioned in another portion of the housing 104B. For clarity, only a minimal number of plates 105 are shown. It should appreciated that the number of plates 105, the size of the plates 105, the angle of inclination of the plates 105, the spacing of the plates 105, and the arrangement of the plate arrays 101 can be varied according to design criteria.

Three launders 102 located in each portion of the housing (104A, 104B) are used to catch the overflow material after it has passed through the plate arrays 101. The launders 102 are spaced between respective plate arrays 101. However, a person skilled in the art would appreciate number and type of launders 102 may be varied according to design criteria.

A collection channel 103 is formed at the end of the launders 102. The collection channel 103 is located between the housing portions (104A, 104B) to collect the overflow material once it has passed through the launders 103. The overflow outlet 3 is connected to the collection channel 103 to remove the overflow material from the housing to be transported for further processing.

In use, the feed slurry is passed through a central pipe 202 which divides into three de-aeration chambers 201 and then passes into the chamber 2. However, a person skilled in the art would appreciate the number and type of de-aeration chambers 201 may be varied according to design criteria. A plurality of fluidization nozzles 5 introduces fluidization fluid (not shown) into the chamber 2 creating a fluidized bed 6. A portion of the slurry and fluidization fluid then passes upwardly through the plate arrays 101 where particles located within the slurry are sorted according to a combination of size and density. The larger and denser particles pass into the bottom of the chamber where they are removed through the underflow outlet (not shown). The smaller and less dense particles are able to pass through the inclined channels 107 of the plate arrays 101 where they pass into launders 102, into the collector 103 and out of the overflow outlet 3.

The housing 104 is provided with a series of fluid introduction tubes 4 located below the plate arrays 101. A person skilled in the art would appreciate the type and number of introduction means may be varied according to design criteria, and that the fluid introduction tubes 4 can have differing cross-sectional configurations. Each fluid introduction tube 4 is provided with a series of holes 8 along the length of each fluid introduction tube 4. Each fluid introduction tube 4 is provided with a dedicated distributor 7. At any given time, the distributor may feed the process liquid 9, the cleaning gas 10, or a combination of both (9, 10) into the fluid introduction tube 4. It should be appreciated that the distributor 7 may accommodate more than two fluids according to design requirement. It should also be appreciated that the distributor 7 may not be required if only one fluid is to be introduced according to design requirement and that at times distributor 7 may not inject any fluid into the fluid introduction tube 4.

There are depicted four fluid introduction tubes 4 extending into each portion of the housing (104A, 104B). It should be appreciated that the number and position of the fluid introduction tubes 4 may be varied according to design requirement. In use, particles can buildup in the inclined channels 107. The process fluid 9 is fed through each of the distributors 7 where it passes into the respective fluid introduction tubes 4, through the respective holes 8, into the chamber 2, through the inclined channels 107 where it passes into launders 102, into the collector 103 and out of the overflow outlet 3. Alternately and for a set duration, the cleaning gas 10 is fed through one of the distributors 7 where it passes into the respective fluid introduction tube 4, through the respective holes 8, and into the chamber 2. The cleaning gas 10 creates bubbles (not shown) in the chamber 2 that travel through the inclined channels 107 of the plate arrays 101. The distributor may be regulated by a controller (not shown). It should be appreciated that introducing the cleaning gas 10 and/or the process liquid 9 into the classifier 1 can be accomplished according to a predetermined sequence or it can be done in accordance with operator or operational requirements. It should also be appreciated that the cleaning gas 10 could be constantly on.

The introduction of the process fluid 9 and the cleaning gas 10 into the chamber 2 between the plate arrays 101 and the fluidized bed 6 provides a number of benefits including removing built up material from the inclined channels 107 resulting in less maintenance downtime for the classifier 1 and optimization the flow through the inclined channels 107.

Figure 5:
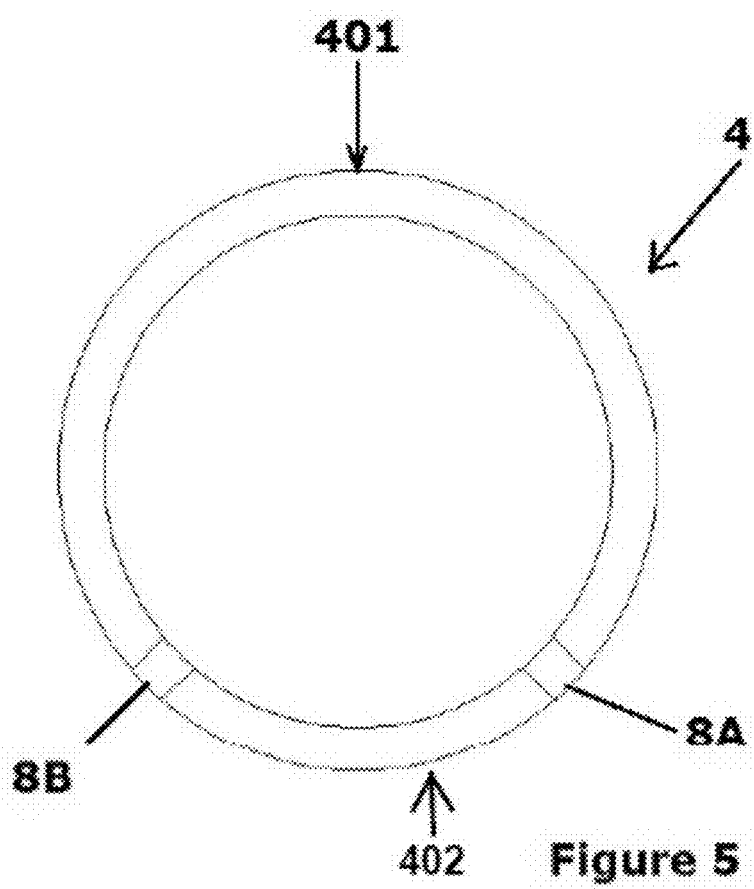
FIG. 5 is a cross section view of the first present preferred embodiment of an introduction tube.

Referring to FIG. 5, there is shown a preferred embodiment of a fluid introduction tube 4 having a first row of holes 8A and a second row of holes 8B. The first row of holes 8A is located at substantially 135° (moving clockwise in FIG. 5) from a top 401 of the introduction tube 4 and the second row of holes 8B is located substantially 225° from the top 401 of the introduction tube 4. A person skilled in the art would appreciate the type, position, and number of holes 8 located in the introduction tubes 4 may be varied according to design criteria.

While certain present preferred embodiments of the classifier and method of using the same have been shown and described above, it is to be distinctly understood that the invention is not limited thereto but may be otherwise variously embodied and practiced within the scope of the following claims.

What is claimed is:

1. A classifier comprising:
   a chamber that is adapted to contain a fluidized bed;
   a plurality of fluidization nozzles provided at a lower region of the chamber for introducing fluidization fluid into the chamber and creating the fluidized bed;
   an array of two or more adjacently arranged inclined plates positioned above the fluidized bed wherein an inclined channel is formed between each pair of adjacent inclined plates;
   an overflow launder positioned adjacent upper edges of the inclined plates;
   means for introducing a process liquid into the chamber below the array of inclined plates and between the fluidized bed and the array of inclined plates, such that in use, the process liquid travels through at least one inclined channel;
   wherein the introduction means comprises at least one fluid introduction tube extending into the chamber and being provided with a plurality of holes adaptable to pass the process liquid and a cleaning gas therethrough and into the chamber;
   a distributor in fluid communication with the introduction means for receiving the process liquid and the cleaning gas and alternatingly introducing the process liquid and the cleaning gas into the chamber such that in use, the process liquid and the cleaning gas alternatingly travel through the at least one inclined channel;
   wherein in use, overflow material containing smaller or less dense particles is removed from the classifier by the overflow launder, whereas underflow material containing larger or denser particles is removed from the classifier by an underflow outlet positioned near a bottom of the chamber.

2. The classifier of claim 1 wherein the introduction means comprises a plurality of fluid introduction tubes that extend into the chamber, with each fluid introduction tube having a dedicated distributor with which it is in fluid communication, each distributor being adapted to receive process liquid and cleaning gas.

3. The classifier of claim 2 wherein the cleaning gas is introduced alternatingly among each of the plurality of fluid introduction tubes according to a predetermined sequence.

4. The classifier of claim 3 wherein there is a plurality of arrays, with each array having a dedicated fluid introduction tube located directly beneath said each array.

5. The classifier of claim 4 wherein the fluid introduction tubes are provided with a plurality of holes positioned on an underside of each fluid introduction tube.

6. The classifier of claim 1 wherein the distributor is regulated by a controller.

7. The classifier of claim 1 wherein the process liquid is water and the cleaning gas is compressed air.

8. The classifier of claim 1 wherein the duration of the introduction of the cleaning gas is shorter than the duration of the introduction of the process liquid.

* * * * *